US009984120B2

(12) United States Patent
Konik et al.

(10) Patent No.: US 9,984,120 B2
(45) Date of Patent: *May 29, 2018

(54) DATABASE STATISTICS BASED ON TRANSACTION STATE

(71) Applicant: International Business Machines Corporation, Armonk, NY (US)

(72) Inventors: Rafal P. Konik, Oronoco, MN (US); Roger A. Mittelstadt, Byron, MN (US); Brian R. Muras, Otsego, MN (US); Chad A. Olstad, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/799,427

(22) Filed: Oct. 31, 2017

(65) Prior Publication Data

US 2018/0046672 A1 Feb. 15, 2018

Related U.S. Application Data

(63) Continuation of application No. 14/751,237, filed on Jun. 26, 2015, which is a continuation of application No. 14/680,243, filed on Apr. 7, 2015.

(51) Int. Cl.
*G06F 17/30* (2006.01)

(52) U.S. Cl.
CPC .. *G06F 17/30463* (2013.01); *G06F 17/30345* (2013.01)

(58) Field of Classification Search
CPC ............... G06F 17/30345; G06F 17/30463
See application file for complete search history.

(56) References Cited

U.S. PATENT DOCUMENTS

| 5,870,758 | A  | 2/1999  | Bamford et al.   |
| 7,089,253 | B2 | 8/2006  | Hinshaw et al.   |
| 7,305,386 | B2 | 12/2007 | Hinshaw et al.   |
| 9,026,538 | B2 | 5/2015  | Promhouse et al. |
| 9,348,641 | B2 | 5/2016  | Mupparti et al.  |
| 9,372,889 | B1 | 6/2016  | Jakobsson et al. |

(Continued)

FOREIGN PATENT DOCUMENTS

WO    2014178851 A1    11/2014

OTHER PUBLICATIONS

Konik et al., "Database Statistics Based on Transaction State," U.S. Appl. No. 14/680,243, filed Apr. 7, 2015

(Continued)

*Primary Examiner* — Heather Herndon
*Assistant Examiner* — Merilyn Nguyen
(74) *Attorney, Agent, or Firm* — James L. Olsen

(57) ABSTRACT

A computer-implemented method for determining a query execution plan based on transaction state may include determining that a first set of database values in a database table are in a committed transaction state and that a second set of database values in the database table are in an uncommitted transaction state. In response to the determining, the first set of database values may have a first set of statistics generated and the second set of database values may have a second set of statistics generated. The first and second set of statistics may be for use in determining a query execution plan.

1 Claim, 6 Drawing Sheets

(56) References Cited

U.S. PATENT DOCUMENTS

| | | |
|---|---|---|
| 9,396,227 B2 | 7/2016 | Graefe et al. |
| 9,558,229 B2 | 1/2017 | Lee et al. |
| 2004/0205066 A1 | 10/2004 | Bhattacharjee et al. |
| 2008/0133458 A1 | 6/2008 | Zabback et al. |
| 2009/0276431 A1* | 11/2009 | Lind ................. G06F 9/466 |
| 2011/0088043 A1* | 4/2011 | Lind ................. G06F 8/315 |
| | | 719/316 |
| 2011/0246503 A1* | 10/2011 | Bender ........... G06F 17/30306 |
| | | 707/769 |
| 2012/0330926 A1 | 12/2012 | Rajan et al. |
| 2013/0066948 A1 | 3/2013 | Colrain et al. |
| 2013/0110766 A1* | 5/2013 | Promhouse ......... G06F 9/466 |
| | | 707/607 |
| 2013/0304714 A1 | 11/2013 | Lee et al. |
| 2014/0040235 A1 | 2/2014 | Rajan et al. |
| 2014/0114950 A1 | 4/2014 | Halverson et al. |
| 2015/0154255 A1 | 6/2015 | Cole et al. |
| 2015/0261805 A1 | 9/2015 | Lee et al. |
| 2015/0317359 A1 | 11/2015 | Tran et al. |
| 2015/0324432 A1 | 11/2015 | Gangloor et al. |
| 2015/0363468 A1 | 12/2015 | Alvey et al. |
| 2016/0110417 A1 | 4/2016 | Lakshminarayan et al. |
| 2016/0246854 A1 | 8/2016 | Pathak et al. |
| 2016/0350371 A1 | 12/2016 | Das et al. |

OTHER PUBLICATIONS

Konik et al., "Database Statistics Based on Transaction State," U.S. Appl. No. 14/751,237, filed Jun. 26, 2015.

Konik et al., "Database Statistics Based on Transaction State," U.S. Appl. No. 15/244,848, filed Aug. 23, 2016.

Accelerated Examination Support Document dated Aug. 11, 2016 for U.S. Appl. No. 15/244,848, 18 pgs.

Konik et al., "Database Statistics Based on Transaction State," U.S. Appl. No. 15/799,487, filed Oct. 31, 2017.

List of IBM Patents or Patent Applications Treated as Related, signed Oct. 31, 2017, 2 pages.

* cited by examiner

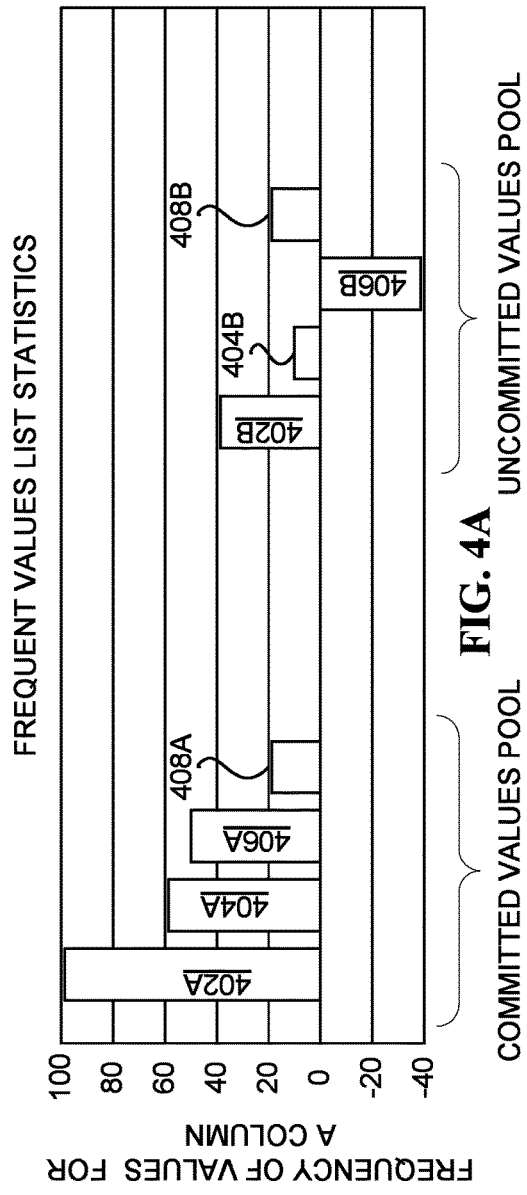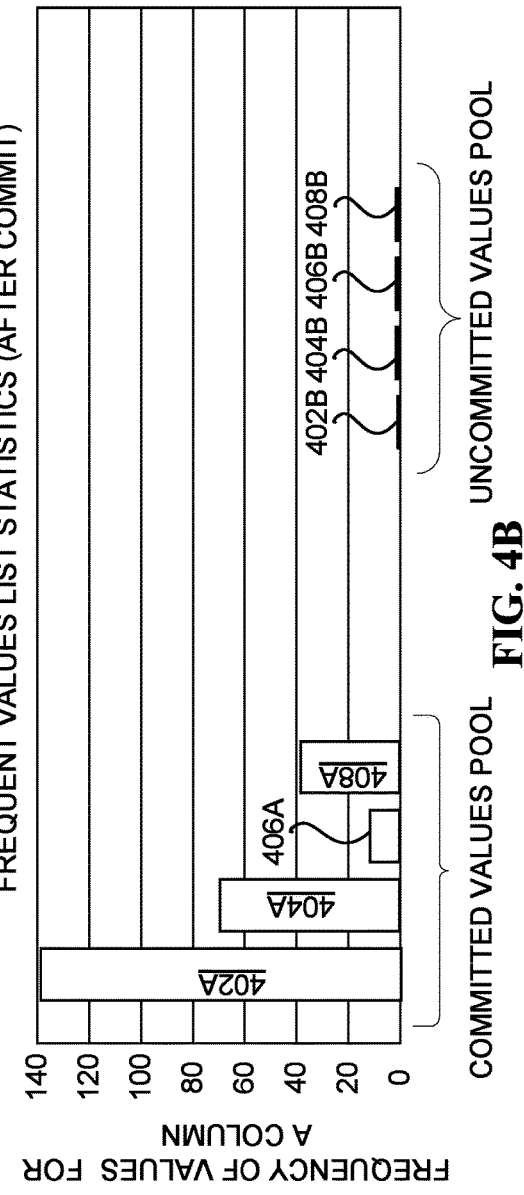

| Commit Flag | Column 1 |
|---|---|
| C | A |
| C | A |
| C | B |
| C | B |
| C | C |
| C | D |
| C | D |
| C | D |
| U | A |
| U | B |
| U | B |
| U | D |

FIG. 6A

| Column 1 | Commit Flag |
|---|---|
| A | C |
| A | C |
| A | U |
| B | C |
| B | C |
| B | U |
| B | U |
| C | C |
| D | C |
| D | C |
| D | C |
| D | U |

FIG. 6B

DATABASE STATISTICS BASED ON TRANSACTION STATE

BACKGROUND

This disclosure relates generally to database management systems, and more specifically, to generating database statistics for a query execution plan based on a transaction state.

Before query execution, database management systems may employ an optimizer engine to determine an efficient or most efficient method to access data requested from a query statement. For example, a cost-based optimizer may generate the best execution plan, which is the plan with the lowest cost among all other candidate plans. When determining an efficient or most efficient plan to access the requested data, the optimizer may utilize various column statistics (e.g., frequent value lists, histograms, cardinality, selectivity, etc.) to track information about column values and data distribution within the columns. These statistics may be foundational for determining whether particular execution plans are implemented.

In some examples, these column statistics may be kept for committed transactions only. A transaction is one or more operations that make up a unit of work performed against a database. For example, an operation to delete a particular database record (i.e., row) from a table and an operation to update another database record may be a transaction. When a transaction is committed, the corresponding operation(s) are executed successfully, (e.g., successfully deleting and updating the database records). When a transaction is uncommitted, the transaction is still in progress and not completed (e.g., a database record is deleted and a database record to be updated has not occurred yet). Queries for data may return database records that are both in a committed and uncommitted transaction state. Alternatively, queries may return database records that are only in a committed transaction state, depending on the locking mechanisms (i.e., isolation levels) utilized within the database.

SUMMARY

One or more embodiments are directed to a computer-implemented method for determining a query execution plan based on transaction state. The method may include determining, by a transaction manager executing on a processor, that a first set of database values in a database table are in a committed transaction state and that a second set of database values in the database table are in an uncommitted transaction state. In response to the determining, the method may include generating, by a statistics manager executing on the processor, a first set of statistics for the first set of database values and generating a second set of statistics for the second set of database values. The first and second set of statistics may be for use in determining a query execution plan.

One or more embodiments are directed to a system for determining a query execution plan based on transaction state. The system may include a computing device having a processor and a memory. The memory may store program instructions and the program instructions may be executable by the processor to cause the system to perform the following operations. An operation to determine that a first set of database values in a database table are in a committed transaction state and that a second set of database values in the database table are in an uncommitted transaction state. In response to the determining, an operation to generate a first set of statistics for the first set of database values and generate a second set of statistics for the second set of database values. The first and second set of statistics may be for use in determining a query execution plan.

One or more embodiments are directed to a computer program product comprising a computer readable storage medium. The computer readable storage medium may include program code embodied therewith. The program code comprising computer readable program code may be configured for determining that a first set of database values in a database table are in a committed transaction state and that a second set of database values in the database table are in an uncommitted transaction state. In response to the determining, the program code comprising computer readable program code may further be configured for generating a first set of statistics for the first set of database values and generating a second set of statistics for the second set of database values. The first and second set of statistics may be for use in determining a query execution plan.

BRIEF DESCRIPTION OF THE DRAWINGS

FIG. 4A is an example illustration of how frequent values list statistics may be generated for both committed and uncommitted database values.

FIG. 4B is an example illustration of how the statistics of the uncommitted values of FIG. 4A may be updated after the uncommitted values become committed.

FIG. 6A is an example illustration of an index and how committed and uncommitted database values may be tracked, according to embodiments.

FIG. 6B is an example illustration of an index and how committed and uncommitted database values may be tracked, according to embodiments.

Figure 1:
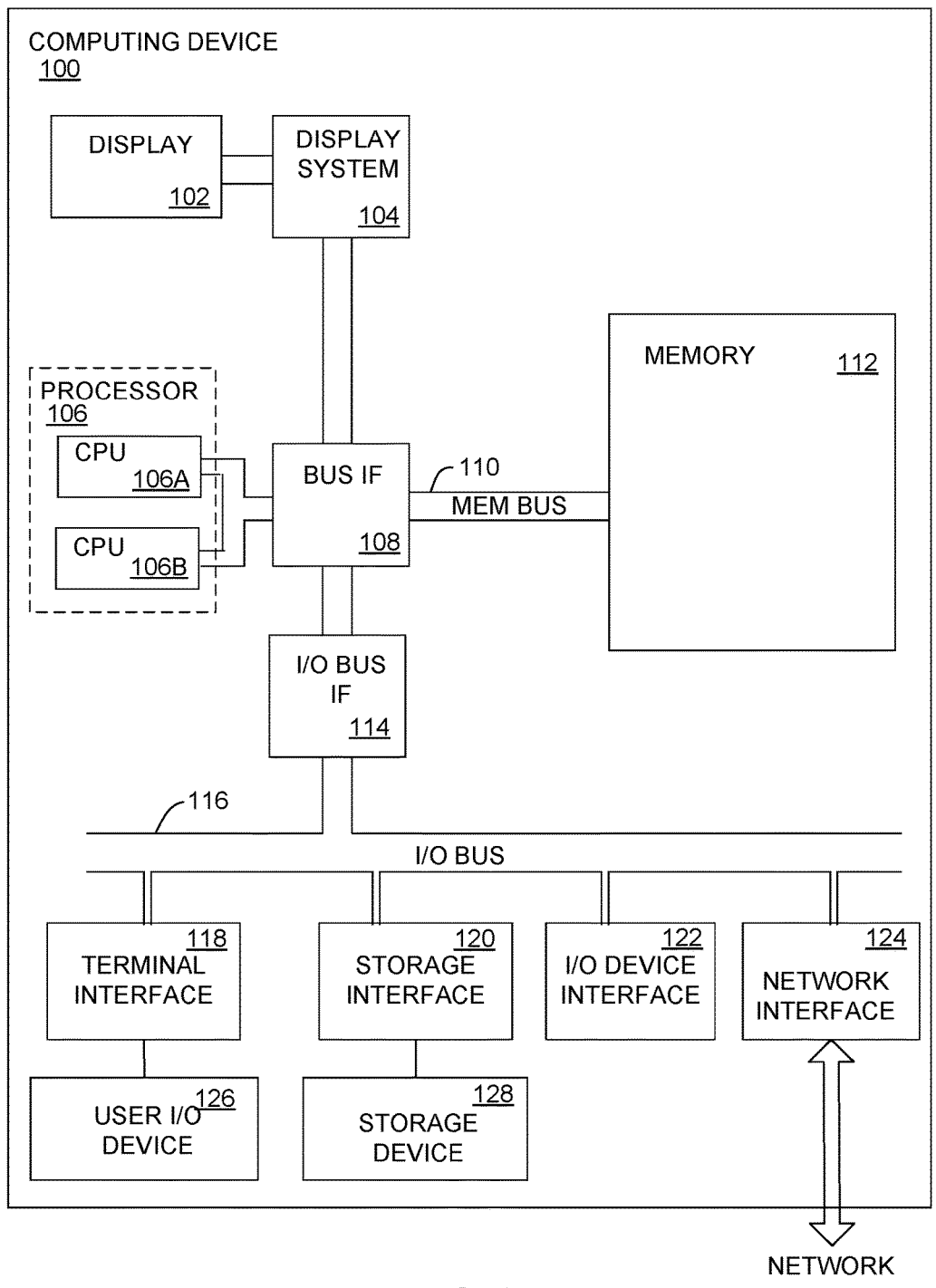
FIG. 1 is a block diagram illustrating an exemplary embodiment of a computing device that includes a memory.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate generally to database management systems, and more specifically, to generating database statistics for a query execution plan based on transaction state. While the present disclosure is not necessarily limited to such application, various aspects of the disclosure may be appreciated through a discussion of various examples using this context.

In a multi-user database environment, transactions may be executed simultaneously. Accordingly, each transaction has the potential to interfere with any other transaction that is running. Without isolation levels (i.e., locking mechanisms), various undesirable effects may occur. For example, two applications, A and B, may both read the same database record from a database, and both of the applications may calculate new values for one of its columns based on the data the applications read. If A updates the database record with its new value and B then also updates the database record, the update performed by A may be lost. In another example, application A may update a value in a database, and application B may read that value before the value was committed. If the value of A is not later committed (i.e., it is uncommitted and is rolled back), the calculations performed by B are based on uncommitted and presumably invalid data. Therefore, a database manager may manage concurrent use of a database through the use of isolation levels, which determine whether data reads for queries may include both uncommitted transaction data and committed transaction data.

Queries may return one or more database records that have values in a committed and uncommitted transaction state (i.e., "dirty" data), depending on the isolation levels utilized. Alternatively, queries may return database record(s) that have values only in a committed transaction state (i.e., "non-dirty" data), also depending on the isolation levels utilized. In one example, query execution plan statistics may be generated for committed data only, even though a query may return mostly uncommitted data. This may cause inaccurate statistics for calculating accurate query execution plans, which may waste system resources and lead to delayed throughput by causing poor query execution plans to be implemented. Accordingly, various embodiments of the present disclosure are directed to efficiently returning sets database records of interest by generating query plan database statistics for both committed and uncommitted database values. The queries that include an isolation level that allows both committed and uncommitted database value reads may use statistics for both committed and uncommitted database values. However, queries that include an isolation level that allows only for committed database reads, may use statistics only for the committed data, and not the uncommitted data.

As disclosed herein, the term "set(s)" means one or more. For example, a first set of database values, means one or more database values. In another example, a set of database records means one or more database records. In yet another example, a set of database statistics means one or more statistics.

FIG. 1 is a block diagram illustrating an exemplary embodiment of a computing device that includes a memory. The components of the computing device 100 can include one or more processors 106, a memory 112, a terminal interface 118, a storage interface 120, an Input/Output ("I/O") device interface 122, and a network interface 124, all of which are communicatively coupled, directly or indirectly, for inter-component communication via a memory bus 110, an I/O bus 116, bus interface unit ("IF") 108, and an I/O bus interface unit 114.

The computing device 100 may include one or more general-purpose programmable central processing units (CPUs) 106A and 106B, herein generically referred to as the processor 106. In an embodiment, the computing device 100 may contain multiple processors; however, in another embodiment, the computing device 100 may alternatively be a single CPU device. Each processor 106 executes instructions stored in the memory 112.

The computing device 100 may include a bus interface unit 108 to handle communications among the processor 106, the memory 112, the display system 104, and the I/O bus interface unit 114. The I/O bus interface unit 114 may be coupled with the I/O bus 116 for transferring data to and from the various I/O units. The I/O bus interface unit 114 may communicate with multiple I/O interface units 118, 120, 122, and 124, which are also known as I/O processors (IOPs) or I/O adapters (IOAs), through the I/O bus 116. The display system 104 may include a display controller, a display memory, or both. The display controller may provide video, audio, or both types of data to a display device 102. The display memory may be a dedicated memory for buffering video data. The display system 104 may be coupled with a display device 102, such as a standalone display screen, computer monitor, television, a tablet or handheld device display, or another other displayable device. In an embodiment, the display device 102 may include one or more speakers for rendering audio. Alternatively, one or more speakers for rendering audio may be coupled with an I/O interface unit. In alternate embodiments, one or more functions provided by the display system 104 may be on board an integrated circuit that also includes the processor 106. In addition, one or more of the functions provided by the bus interface unit 108 may be on board an integrated circuit that also includes the processor 106.

The I/O interface units support communication with a variety of storage and I/O devices. For example, the terminal interface unit 118 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 126 and the computing device 100, may receive output data via the user output devices. For example, a user interface may be presented via the user I/O device 126, such as displayed on a display device, played via a speaker, or printed via a printer.

The storage interface 120 supports the attachment of one or more disk drives or direct access storage devices 128 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 128 may be implemented via any type of secondary storage device. The contents of the memory 112, or any portion thereof, may be stored to and retrieved from the storage device 128 as needed. The I/O device interface 122 provides an interface to any of various other I/O devices or devices of other types, such as printers or fax machines. The network interface 124 provides one or more communication paths from the computing device 100 to other digital devices and computer systems.

Although the computing device 100 shown in FIG. 1 illustrates a particular bus structure providing a direct communication path among the processors 106, the memory 112, the bus interface 108, the display system 104, and the I/O bus interface unit 114, in alternative embodiments the computing device 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 114 and the I/O bus 108 are shown as single respective units, the computing device 100, may include multiple I/O bus interface units 114 and/or multiple I/O buses 116. While multiple I/O interface units are shown, which separate the I/O bus 116 from various communication paths running to the various I/O devices, in other embodiments, some or all of the I/O devices are connected directly to one or more system I/O buses.

In various embodiments, the computing device 100 is a multi-user mainframe computer system, a single-user system, or a server computer or similar device that has little or no direct user interface, but receives requests from other computer systems (clients). In other embodiments, the computing device 100 may be implemented as a desktop computer, portable computer, laptop or notebook computer, tablet computer, pocket computer, telephone, smart phone, or any other suitable type of electronic device.

In an embodiment, the memory 112 may include a random-access semiconductor memory, storage device, or storage medium (either volatile or non-volatile) for storing or encoding data and programs. In another embodiment, the memory 112 represents the entire virtual memory of the computing device 100, and may also include the virtual memory of other computer systems coupled to the computing device 100 or connected via a network 130. The memory 112 may be a single monolithic entity, but in other embodiments the memory 112 may include a hierarchy of caches and other memory devices. For example, memory may exist in multiple levels of caches, and these caches may be further divided by function, so that one cache holds instructions while another holds non-instruction data, which is used by the processor. Memory 112 may be further distributed and associated with different CPUs or sets of CPUs, as is known in any various so-called non-uniform memory access (NUMA) computer architectures.

Figure 2:
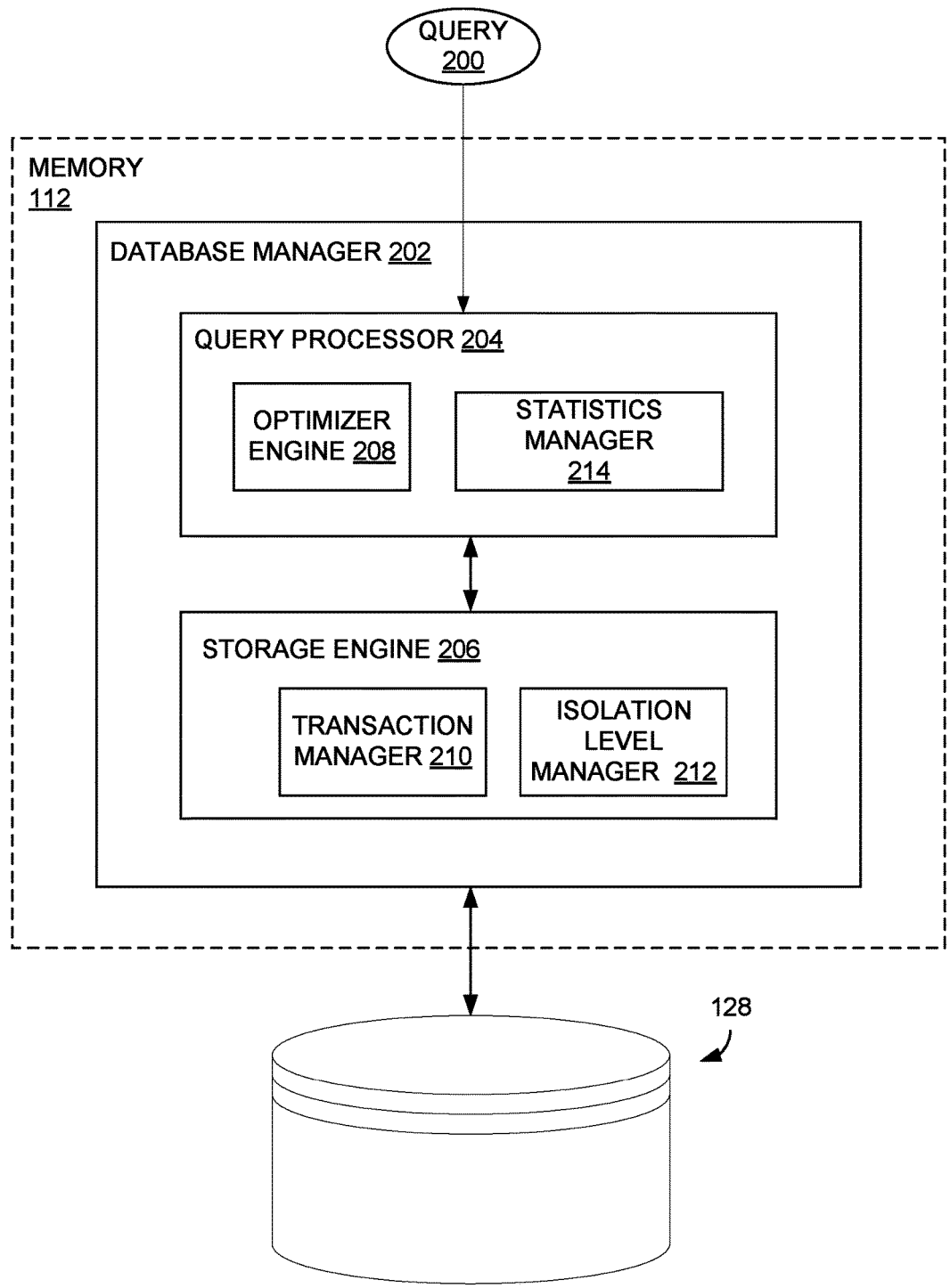
FIG. 2 is a block diagram illustrating an exemplary embodiment of components and data that can reside in the memory of FIG. 1, including a database manager.

The memory 112 may store all or a portion of the components and data shown in FIG. 2. These programs and data structures are illustrated in FIG. 2 as being included within the memory 112 in the computing device 100; however, in other embodiments, some or all of them may be on different computer systems and may be accessed remotely, e.g., via a network 130. The computing device 100 may use virtual addressing mechanisms that allow the programs of the computing device 100 to behave as if they only have access to a large, single storage entity instead of access to multiple, smaller storage entities. Thus, while the components and data shown in FIG. 2 are illustrated as being included within the memory 112, these components and data are not necessarily all completely contained in the same storage device at the same time. Although the components and data shown in FIG. 2 are illustrated as being separate entities, in other embodiments some of them, portions of some of them, or all of them may be packaged together.

In an embodiment, the components and data shown in FIG. 2 may include instructions or statements that execute on the processor 106 or instructions or statements that are interpreted by instructions or statements that execute the processor 106 to carry out the functions as further described below. In another embodiment, the components shown in FIG. 2 may be implemented in hardware via semiconductor devices, chips, logical gates, circuits, circuit cards, and/or other physical hardware devices in lieu of, or in addition to, a processor-based system. In an embodiment, the components shown in FIG. 2 may include data in addition to instructions or statements.

FIG. 1 is intended to depict representative components of the computing device 100. Individual components, however, may have greater complexity than represented in FIG. 1. In FIG. 1, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different ways, including using various computer applications, routines, components, programs, objects, modules, data structures etc., which may be referred to herein as "software," "computer programs," or simply "programs."

FIG. 2 is a block diagram illustrating an exemplary embodiment of components and data that can reside in the memory of FIG. 1, including a database manager 202. In an embodiment, the database manager 202 may include a query processor 204 and a storage engine 206, which may interact with a storage device 128 to retrieve data within a database file. The query processor 204 may include an optimizer engine 208 and a statistics manager 214. The storage engine 206 may include a transaction manager 210 and isolation level manager 212. In various embodiments, these components and data may be program instructions that are part of a system and executable by a processor of a computing device to cause the system to determine that a first set of database values in a database table are in a committed transaction state and that a second set of database values in the database table are in an uncommitted transaction state. These components and data are also operable to generating a first set of statistics for the first set of database values and generating a second set of statistics for the second set of database values. The first and second set of statistics are used for determining a query execution plan.

Consistent with some embodiments, a user may issue a query 200 and the database manager 202 may receive the query 200 to retrieve one or more database records from a database file within the storage device 128. For example, the query 200 may specify inserting multiple database records to a database file. The query 200 may be written in any suitable query language that corresponds to the desired database type. For example, the query 200 may be written in structured query language (SQL) for relational databases, data manipulation language (DML) for inserting, updating, or deleting database records in relational databases, multidimensional expression (MDX) for multidimensional or online analytical procession (OLAP) databases, or any other language for any other database.

In embodiments, the database manager 202 may initiate the process of selecting the one or more database records that are being requested from the query 200 by utilizing the query processor 204. In an embodiments, query processor 204 may generate several plans to access database records and execute the most efficient plan. Alternatively, the query processor 204 may generate an efficient plan, which is not necessarily the most efficient. The query processor 204 may include such components as a compiler, a parser engine, an optimizer engine 208, and an execution engine. A compiler may receive the query 200 and convert the query 200 into machine-readable object code.

The parser engine may receive the compiled query 200 and check that the query 200 is correctly specified, resolve names and references, and convert the query 200 into a format utilized by the optimizer engine 208. The parser engine may convert the query 200 into a data structure, which gives a structural representation of the query 200. For example, the data structure may be an abstract syntax tree, parse tree, or other data structure. In various embodiments, the parser engine may make a plurality of checks, including a syntax check, a check determining whether the query 200 is meaningful, and a shared pool check.

In various embodiments, the optimizer engine 208 may receive the parsed query 200 to determine an efficient or most efficient query execution plan of selecting the one or more database records based on which database record(s) are requested in the query 200. In other embodiments, other database manager 202 modules may determine a query execution plan. In embodiments, an optimizer engine 208 may determine the cost of each query execution plan through an estimator. In an embodiment, an estimator may estimate the cost of each query execution plan by measuring the units of work or resources used. For example, the estimator may use disk I/O, central processing unit (CPU) usage, and memory usage to calculate units of work. The cost of a query execution plan may accordingly represent a number of work units that are expected to be absorbed when the query 200 is executed and the results produced. In some embodiments, to arrive at a final cost estimation, the estimator may use such measurement statistics as cardinality and selectivity. Cardinality may be the number of unique values in a given column or columns of a table. Selectivity internally calculates the percentage of database records that will be selected in a database record set based on the query 200. The estimator may also utilize a frequent value list, which provides the distribution level of all of the values, including the most frequent values for any given column or set of columns.

According to some embodiments, in order to calculate cardinality, selectivity, frequent value lists or other query execution plan statistics, the optimizer engine 208 may communicate with the statistics manager 214, which may be responsible for organizing and calculating all of the needed statistics. In embodiments, after the statistics manager 214 makes appropriate calculations, the optimizer engine 208 may utilize the statistics needed for a query execution plan. Other statistics that the statistics manager 214 or optimizer engine 208 may utilize for query execution plans are one-dimensional value distributions such as simple histograms or density functions. Histograms may be a grouping of all of the values of a column in logical buckets or groups. In various examples, a simple histogram may be generated before query requests are made. In another example, a simple histogram may also be generated by creating them as needed ("salt and pepper" approach). In yet another example, a simple histogram may be built for all columns ("over kill hammer" approach). In various embodiments, the simple histogram type may be frequency, top frequency, height-based, hybrid, or other simple histogram configurations. In various embodiments, the optimizer engine 208 or statistics manager 214 utilizes several different mechanisms to gather data for simple histogram preparation such as data sampling, direct queries that verify the number of database records for a given bucket range of values (also referred to as intervals or periods), modification of insertion, deletion operations to update the simple histogram matrix, or any other data gathering mechanism. In other examples, the histograms may be multidimensional or multicolumn histograms.

In various embodiments of the present disclosure, the statistics manager 214 may be responsible for generating statistics for a set of database values in a committed state and a set of database values in an uncommitted state, as described more below. The statistics may be used for determining a query execution plan.

In embodiments, after the statistics have been generated and the optimizer engine 208 generates an efficient or most efficient query execution plan, the execution engine may execute the query 200 against the storage device 128. The execution engine may also order tables in any particular join order according to any join method, which is chosen by the optimizer engine 208. For example, the execution engine may run a nested loop, sort merge, or hash method as its chosen join method.

In various embodiments, the storage engine 206 may use the chosen query execution plan from the query processor 204 to select one or more database records from a database file in the storage device 128. In other embodiments, the one or more database records may be cached or buffered in the memory 112, and may therefore be selected from the memory 112. In some embodiments, the storage engine 206 may be a part of the execution engine of the query processor 204. The storage engine 206 may provide interface between low level data stored in database files of a storage device 128 and higher level applications. The storage engine 206 may interface with the database files by translating various query statements into low-level file system commands. For example, the storage engine 206 may be responsible for selecting one or more database records from a database file in order for a delete operation to occur. In some embodiments, the storage engine 206 may actually select the one or more database records via an operating system component (e.g., disk manager).

The transaction manager 210 may be responsible for coordinating various transactions within the storage device 128. In some embodiments, the transaction manager 210 may determine whether the one or more database records are in a committed transaction state or uncommitted transaction state. In other embodiments, another database manager 202 module may determine whether the one or more database records are in an uncommitted or committed transaction state (e.g., log manager). A transaction is one or more operations that make up a unit of work performed against a storage device 128. For example, a transaction may include the I/O operations of reading one or more database records, and updating the values of the database records. The information about the reading and updating operations may be stored to a transaction log. A transaction log (also known as a journal, journal receiver, commit log, etc.) is a log that records various operations in a transaction as they occur in real time. For example, a transaction manager 210 (or log manager) may write to a transaction log specifying that the reading and updating operations occurred at a particular time. This may be done to record the specific point in time such transaction took place in case of data recovery at a later time. In various embodiments, a transaction may be in multiple states. For example, the transaction may be in in active state (uncommitted). In an active state, a transaction has begun and is currently being executed by the transaction manager 210, which may be the initial state of every transaction. The transaction may also be in a partially committed (uncommitted) state. In a partially committed state, the transaction manager 210 has executed its final operation without performing various checks (e.g., the consistency state of a storage device 128 after applying output of the transaction on the storage device 128). The transaction may be in a committed state. If the transaction manager 210 executes all of its operations successfully, which includes successfully performing various checks, then the transaction may be in a committed state. Accordingly, all of the committed transactions may permanently be applied to the storage device 128. The transaction may also be in a failed (uncommitted) state. If any checks made fail, the transaction may be in a failed state such that the transaction can no longer proceed. If any of the checks fail, and the transaction is in a failed state, the recovery manager (not shown) or transaction manager 210 may "rollback" any uncommitted transactions to place the storage device 128 in a state prior to the start of the execution of the transaction, which is called an aborted state (e.g., re-start transaction). Consistent with some embodiments, when the transaction is in an uncommitted state, the transaction manager 210 may generate data to be placed in a log record and request a log manager to write the contents of the log record to a transaction log of the storage device 128.

In one or more embodiments, an isolation level manager 212 may be utilized to determine whether data includes an isolation level that allows a read for the database values based on a query request. In some embodiments however, another database manager 202 module may perform these functions (e.g., lock manager). In embodiments, an isolation level is a locking mechanism utilized by a lock manager to lock for a query, one or more data objects (e.g., database records) that are part of a transaction that is in the process of being completed. This may be a way to manage concurrency such that the database manager 202 may handle simultaneous transactions involving the same data. Accordingly, the isolation level may determine whether database values in an uncommitted and committed transaction state can both be accessed for a particular query request.

Consistent with various embodiments, there may be many isolation levels for the data in a database file. For example, one isolation level is a "No Commitment" (NC) isolation level. For the NC isolation level, commit and rollback operations may have no effect on query requests. Accordingly, both uncommitted and committed database record(s) may be returned to a user because there may be no locks placed on the corresponding database record(s).

In some embodiments, the isolation level manager 212 may determine that an "Uncommitted Read" (UR) isolation level is included for the data. This may also be known as a "dirty read" level. UR isolation level transactions may include very few locks. Accordingly, transactions may not wait for a lock manager to release locks. In this isolation level, just like NC isolation level, both uncommitted and committed database records may be retrieved from a query.

In embodiments, the isolation level manager 212 may determine that queried data includes a "Cursor Stability" (CS) isolation level. This isolation level may allow for locking any database record on which a cursor (e.g., pointer) is positioned during a transaction. A cursor is a data structure that may allow retrieval or removal of a database record. The lock on the database record may be held until the next database record is fetched or the transaction is terminated. For example, the transaction may include the retrieval of a database record, the deleting of it, and inserting of another database record. After the entire transaction is finished, the lock may then be released. In these embodiments, a transaction may be terminated when either a commit (as specified in the example above) or rollback is executed. Accordingly, only committed transaction state database records may be retrieved by a query for the CS isolation level.

In some embodiments, the isolation level manager 212 may determine that queried data includes a "Read Stability" (RS) isolation level. The RS isolation level may lock those database records that are part of a result set. For example, if a table contains 10,000 database records and a query returns 10 rows, then only 10 rows may be locked until the end of a transaction. Accordingly, instead of locking a single database record, it may lock all database records that are part of a result set. The RS isolation level may therefore only allow for a query read of committed database records.

In various embodiments, the isolation level manager 212 may utilize a "Repeatable Read" (RR) isolation level. The RR isolation level may allow for the locking of all the rows than an application references within a unit of work, no matter how large the result set is. For example, an application may reference an entire table of database records within a unit of work and may have a corresponding lock on the entire table. The RR isolation level may also not allow for a query read of any uncommitted data. The RR isolation level may also ensure repeatable reads to applications. Therefore, a repeated query may get the same database record set as long as it is executed in the same transaction. The isolation level manager 212 (or a lock manager) may use these various isolation levels (e.g., CS, RS, and RR isolation levels) to prohibit queries from accessing uncommitted data requested by other queries (except for NC and UR isolation levels) and to prohibit the updating of database records by other transactions when a lock owning transaction is using a restrictive isolation level.

Figure 3:
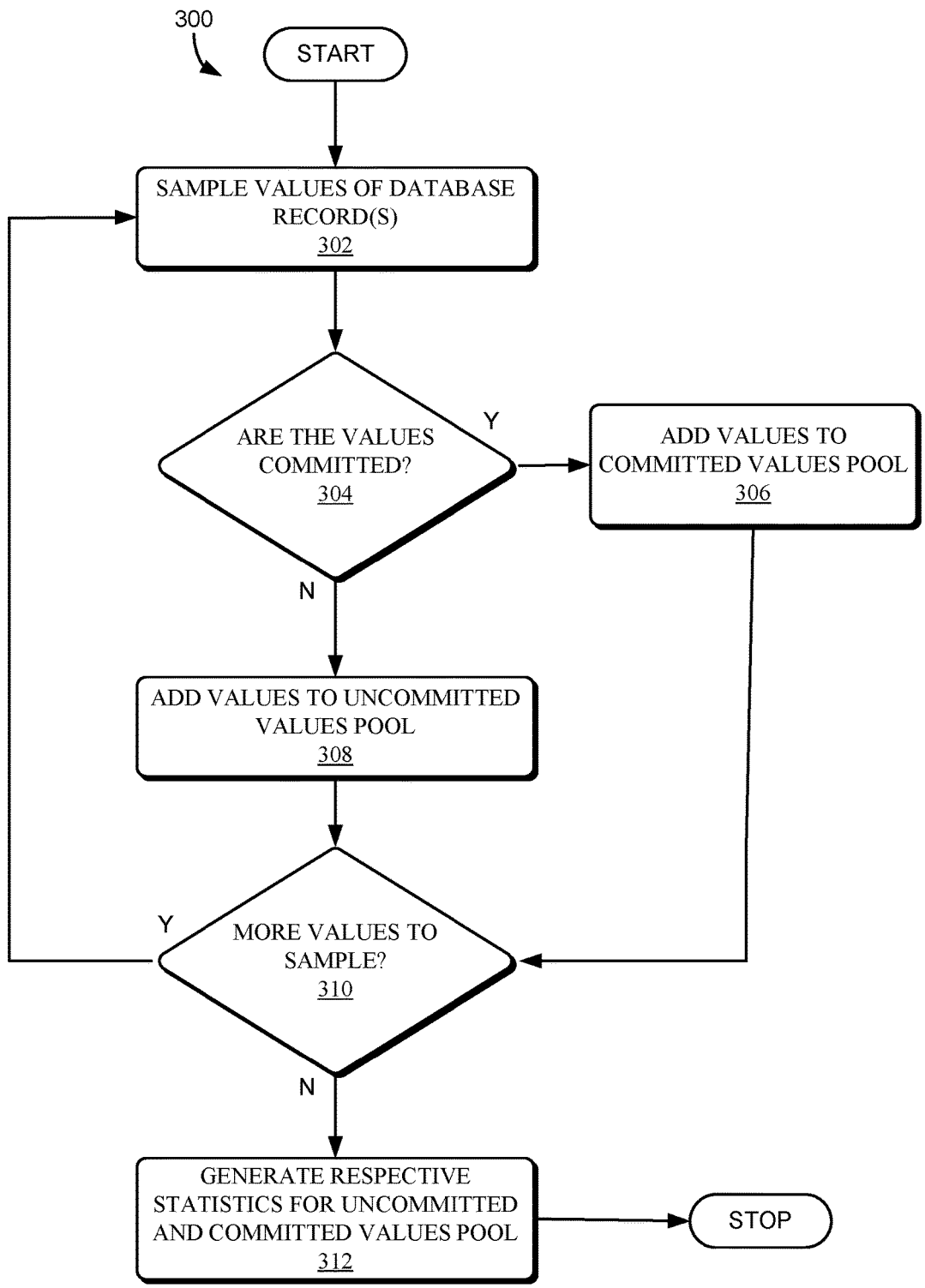
FIG. 3 is flow diagram of an example process for generating statistics based on a transaction state, according to embodiments.

FIG. 3 is flow diagram of an example process 300 for generating statistics based on a transaction state, according to embodiments. The process 300 may begin with operation 302 when a statistics manager or optimizer samples values of one or more database records. Accordingly, the statistics manager or optimizer may select various database records within a table of a database. The database records may include database values. In operation 304, the statistics manager or optimizer may determine whether the sampled database values are in a committed or uncommitted transaction state. This determination may be performed according to various embodiments. For example, operation 304 may be based on reading a transaction log, the transaction log storing transaction data. In embodiments, a transaction log stored in memory may only include uncommitted operations that make up a transaction. Therefore, the database manager may determine that various sampled values are included in a transaction log thereby allowing an inference that the sampled data is uncommitted. Alternatively, the database manager may determine that the various sampled values are not included in the transaction log thereby allowing for an inference that the sampled data is in a committed transaction state.

In some embodiments, operation 304 may be based on reading the database table input/output operations. For example, a database manager may read an "update" operation on a database table, and determine that the corresponding transaction remains active (e.g., a user has not performed a "delete" operation yet). Accordingly, the database manager may determine that the data for the "update" operation may be in an uncommitted transaction state. In some embodiments, operation 304 may be based on reading a column value of a column on an index object. The index object table may include committed and uncommitted database values. The column value may specify whether the database values are in a committed transaction state or uncommitted transaction state. This embodiment is described in more detail in FIG. 6 below.

If the sampled database values are in a committed transaction state, then a statistics manager or optimizer may perform operation 306 by adding the sampled values to a committed values pool, as discussed above. In embodiments, once the values are added to the committed values pool, operation 310 may be performed to determine whether a sample of more values is needed. In operation 304, if the sampled values are not in a committed transaction state (i.e., the values are in an uncommitted transaction state), then the statistics manager or optimizer may perform operation 308 by adding the sampled values to an uncommitted values pool, as described above. When the sampled values are added to the uncommitted values pool, a statistics manager or optimizer may perform operation 310 to determine whether any more values need to be sampled. If there are more values that need to be sampled (e.g., because not all of the values in a database file have been sampled), then operations 302 and 304 may be repeated, and possibly 306 or 308. If no more values need to be sampled according to operation 310 (e.g., because all of the values in a table have been sampled), then the statistics manager or optimizer may perform operation 312 to generate statistics for the data values that are in the committed values pool (operation 306) and generate statistics for the data that are in the uncommitted values pool (operation 308). For example, histograms or frequent value list statistics may be generated for the pooled data, as described below in FIG. 5.

FIG. 4A is an example illustration of how frequent values list statistics may be generated for both committed and uncommitted database values. A frequent value list may be a column statistic that determines a quantity range of each value within a column of a table (e.g., the name Joe is listed 10 times in the name column, so the range is 10). In some embodiments, the frequent value list may be a statistic that determines a quantity of times each value has been queried for each column. FIG. 4A includes a committed values pool (i.e., 402A, 404A, 406A, and 408A) and a corresponding uncommitted values pool (i.e., 402B, 404B, 406B, and 408B). Value pairs 402A and 402B may be considered to be the same value (e.g., the name "John"), but a part of different values pools. Value pairs 404A and 404B, v406A and 406B, 408A and 408B may follow the same principle of being the same values, but in separate values pools.

In this illustrative example of FIG. 4A, a query statement may request all of the values within column 406A and/or 406B that correspond to the first set of database records (e.g., SELECT*FROM MY_Table WHERE COL1=406). In an example, if the query includes a request for all of the 406 values (i.e., 406A and 406B), but the values include an isolation level (e.g., CS, RS, or RR) that does not allow a read or retrieval of uncommitted values (i.e., 406B), then the optimizer may utilize statistics only for the committed values (i.e., 406A). Accordingly, the statistics estimate for frequent value list of column 406 may be 50 values returned (adding the frequency of values for 406A only and not 406B). However, if the values include an isolation level (e.g., NC or UR) that allows a read or retrieval of both committed and uncommitted values, then the statistics estimate for value 406 may be 10 database records, as represented by: 406A+406B (50+−40=10). In this latter example, the frequent value list statistic may be computed by adding commit and uncommitted sections of the statistic. In embodiments, the negative values (e.g., −40 (406B)) may correspond to a delete or update operation of values.

For a further example, if it is assumed that an isolation level allows for both uncommitted and committed data reads, 402A committed value quantity range at 100 may be added with 402B uncommitted value frequency to arrive at an estimation of 140 (100+40) value frequency for the column. In yet another example (assuming the same isolation level), 408A value frequency may be 20, which may be added with the corresponding 408B uncommitted value frequency to arrive at an estimation of 40 (20+20).

FIG. 4B is an example illustration of how the statistics of the uncommitted values of FIG. 4A may be updated after the uncommitted values become committed. In FIG. 4B, because all of the uncommitted values (402B, 404B, 406B, and 408B) have all become committed (i.e., the transactions have completed), there is a quantity range value of zero, as there are no more uncommitted values. The calculation for the committed values pool in FIG. 4B may be calculated by adding the committed values of FIG. 4A with the corresponding uncommitted values of FIG. 4A. For example, 402A of FIG. 4A (100)+402B of FIG. 4A (40)=402A of FIG. 4B (140). In another example, 404A of FIG. 4A (60)+404B of FIG. 4A (10)=404A of FIG. 4B (70). The significance of FIG. 4B is that queries for data subject to isolation levels that allow data reads only for committed data may have vastly different statistics when the uncommitted values become committed. When the uncommitted values become committed, the optimizer may need to re-optimize a query execution plan, as described in more detail in FIG. 5 below.

Figure 5:
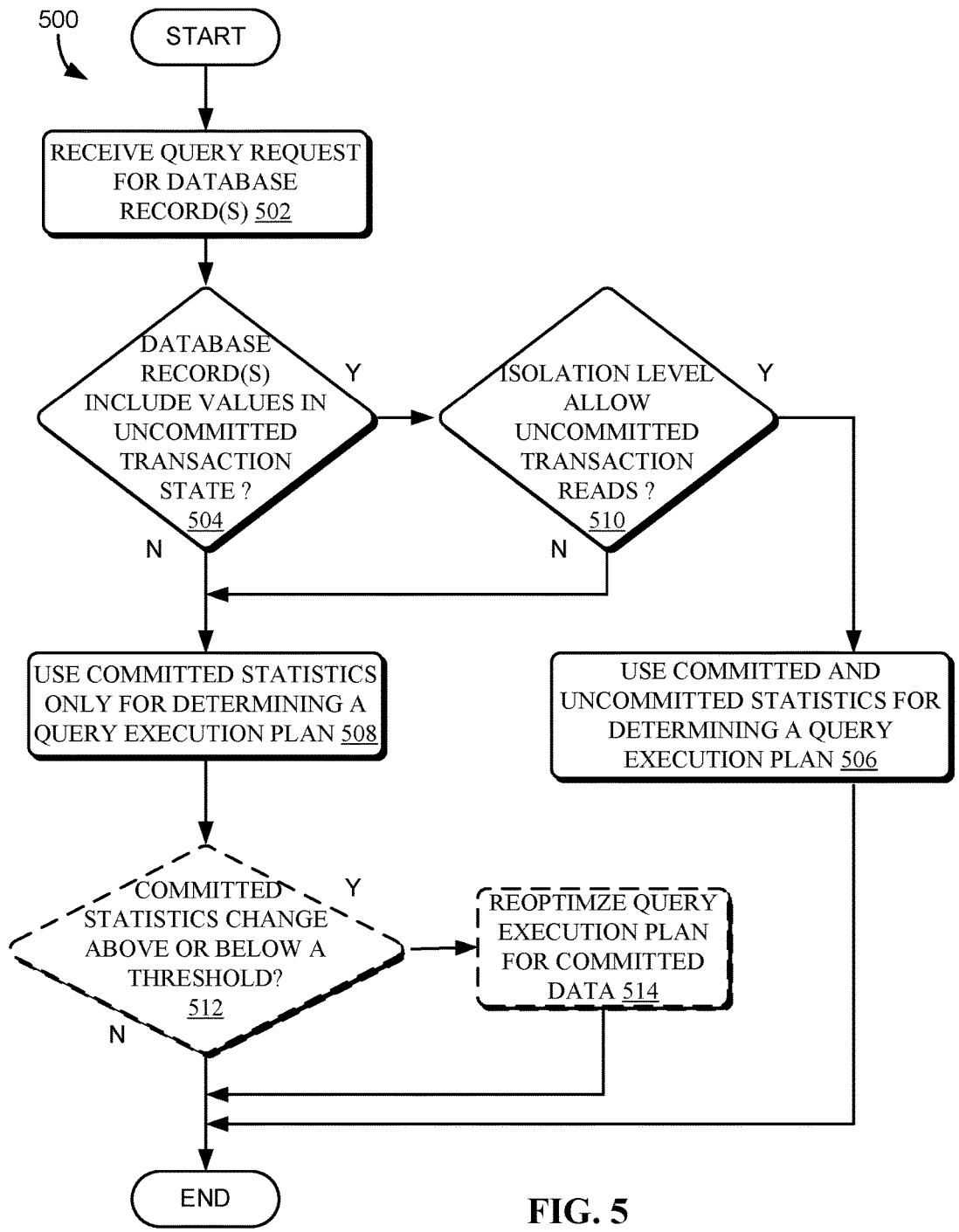
FIG. 5 is a flow diagram of a process for determining a query execution plan based on isolation level and corresponding statistics.

FIG. 5 is a flow diagram of a process 500 for determining a query execution plan based on isolation level and corresponding statistics. The process 500 may start when the database manager performs operation 502 by receiving a query request from a user specifying what particular database record(s) the user wants returned. A transaction manager, index manager, or other database manager component, as described above (and in FIGS. 6A and 6B below), may then perform operation 504 to determine whether the requested database record(s) are in an uncommitted transaction state. If the database record(s) are not in an uncommitted transaction state (i.e., they are in a committed transaction state by not being subject to any other pending transaction), then operation 508 may be performed, which is described below.

If the database record(s) include values that that are in an uncommitted transaction state, then an isolation manager may perform operation 510 to determine if an isolation level allows uncommitted transaction data reads. If the isolation level allows uncommitted data reads (e.g., NC or UR), then the optimizer may perform operation 506 to use both committed and uncommitted statistics for determining a query execution plan. For example, referring back to FIG. 4A, the optimizer may use both the uncommitted values pool and the committed values pool statistics for the corresponding values, as discussed above. In some embodiments, there may be a re-optimization of the determined query execution plan in operation 506 (similar to operation 514) because of a change in statistical measures. In other embodiments, the process 500 may end after operation 506. In operation 504, if the isolation level does not allow uncommitted data reads (i.e., it allows committed transaction state data reads only for retrieving the data), then an optimizer may perform operation 508 to use committed statistics only for determining a query execution plan. For example, referring back to FIG. 4A, the optimizer may only use the committed values pool, as discussed above.

In some embodiments, the optimizer may perform operation 512 to determine if the committed statistics have changed above a threshold. For example, using the illustration of FIG. 4A and FIG. 4B above, committed statistics may have greatly changed over time for the same values, thereby warranting a change in a query execution plan. If at a first time, a user issues a query for value 406 only, but the isolation level only allows committed data reads, then value 406A may only be utilized for the statistic (i.e., estimate of 50) because 406B is not committed. However, at a second time, 406B may change to become committed. If 406B becomes committed, and the isolation level still allows committed data reads, then the statistics may be updated such that the estimate for 406 may be vastly different—an estimate of 10, as opposed to 50 (50+−40). Accordingly, the optimizer may decide that the statistics have changed above or below a threshold value (e.g., change in + or −30 in quantity value estimation when statistics become committed). The threshold value may be any suitable value, depending on the statistic and system resources. In operation 514, an optimizer may re-optimize or change a query execution plan for the committed data if the statistics have changed above or below a threshold, and then the process 500 may end. If the committed statistics have not changed above a threshold in operation 512, then the optimizer may not have to re-optimize a query execution plan (i.e., the original query execution plan may be used in operation 508), and the process 500 may end.

The committed and uncommitted transaction state of database records that are part of a query may be tracked by a database manager in various manners. For example, the database manager may use a transaction log to keep track of which transactions (which include database values) are in a committed and uncommitted transaction state, as described above. The database manager may also utilize an index object for determining whether data is in a committed or uncommitted transaction state. The database manager may determine whether a set of database values in a database table are in a committed or uncommitted transaction state by reading a column value of a column on an index object. The column value may specify that at least one database value is in a committed transaction state, and at least one database value is in an uncommitted transactions state.

FIG. 6A is an example illustration of an index object and how committed and uncommitted database values may be tracked, according to embodiments. FIG. 6A illustrates a "Commit Flag" (bit or byte) Column within the index object, which may be utilized to determine which database records are committed or uncommitted. The "C" value may be used to represent database values that are in a committed transaction state. The "U" value may be used to represent database values that are in an uncommitted transaction state. The "Column 1" column illustrates various database record values (A, B, C, and D) within a particular column.

In some embodiments, as shown if FIG. 6A, if the index object is used when the isolation level does not allow for uncommitted transaction data reads (e.g., CS, RS, or RR isolation levels), the "Commit Flag" column is oriented as the first (i.e., leftmost) column of the index object so that the data may be cleanly partitioned into uncommitted and committed branches of the index tree for runtime and returning database records. In some embodiments, the first column of the index object determines how branches of a corresponding index tree are organized. For example, the first 8 rows of values of the "Commit Flag" column of FIG. 6A may be partitioned into a branch of an index tree, which includes all of the committed database values. One branch of the index tree may also include all of the uncommitted database values. In embodiments, the first column of the index object may correspond to a root node level key of a respective index tree. In these embodiments, the root node level key is the starting key.

FIG. 6B is also an example illustration of an index object and how committed and uncommitted database values may be tracked, according to embodiments. FIG. 6B, illustrates that the "Column 1" column is oriented in a leftmost or first position in an index object and the "Commit Flag" column is oriented in a rightmost position or last column within the index object. This orientation may occur when the queried data includes an isolation level that allows both uncommitted and committed transaction data reads (e.g., the isolation levels are UR or NC). Accordingly, all of the database records may be accessed by a query and so partitioning the commit and uncommitted database records into groups may have no advantageous effect for query results. In some embodiments, the last column in the index object may correspond to leaf node level keys in a corresponding index tree. In FIGS. 6A and 6B, the respective indexes may be optimized for the primary runtime use, but the index statistics (e.g., estimate key range, cardinality, etc.) can still be given for queries which are outside of the primary runtime usage. For example, if an isolation level for the data does not allow uncommitted data reads, a statistics manager may still give statistics estimates for uncommitted database records. In these embodiments, the query optimizer may apply an internal query to at least a portion of the query. For example, the query may be: "CommitFlag IN ('U', 'C')," which may be a statistical query for all of the committed and uncommitted database records, or "CommitFlag IN ('C')," which may be a statistical query for only the committed database records.

The present invention may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system comprising:

at least one computing device having one or more processors; and at least one computer readable storage medium having program instructions embodied therewith, the program instructions readable/executable by the one or more processors to cause the system to perform a method, the method comprising:

determining that a first set of database values in a database table are in a committed transaction state and that a second set of database values in the database table are in an uncommitted transaction state, wherein the determining includes reading a first set of column values and second set of column values of a plurality of columns within one or more index objects, the first set of column values specifying that the first set of database values are in a committed transaction state, and the second set of column values specifying that the second set of database values are in an uncommitted transactions state;

in response to the determining, generating a first set of statistics for the first set of database values and generating a second set of statistics for the second set of database values, the first and second set of statistics for use in determining a query execution plan, wherein the first set of statistics and the second set of statistics include: histogram statistics, cardinality statistics, frequent value list statistics, and selectivity statistics;

receiving a first query request to access a first set of database records that includes one or more of the first set of database values and one or more of the second set of database values;

determining that a first isolation level allows a read of the first and second set of database values, wherein the isolation level determines whether database values in an uncommitted transaction state and database values in a committed transaction state can both be accessed for a particular query request;

in response to the determining that a first isolation level allows a read of the first and second set of database values, using one or more of the first set of statistics and one or more of the second set of statistics to determine a first query execution plan for accessing the first set of database records;

receiving a second query request to modify a second set of database records that includes at least one of the first set of database values and at least one of the second set of database values;

determining, for the second query request, that a second isolation level only allows a modification of the first set of database values but not a modification of the second set of database values;

using, for the second query request, at least one of the first set of statistics for the at least one of the first set of database values to determine a second query execution plan, wherein the second set of statistics for the second set of database values are not used;

changing the uncommitted transaction state of the at least one of the second set of database values to a committed transaction state;

in response to the changing, updating the at least one of the first set of statistics by generating a third set of statistics and updating at least one of the second set of statistics by generating a fourth set of statistics;

receiving a third query request to modify the second set of database records;

determining for the third query request, that a third isolation level allows a modification of the first set of database values and the at least one of the second set of database values that have been changed to the committed transaction state; and using the third and fourth set of statistics to change the second query execution plan to a third query execution plan.

* * * * *